US011856309B2

United States Patent
Yang

(10) Patent No.: US 11,856,309 B2
(45) Date of Patent: Dec. 26, 2023

(54) PIXEL ARRAY, IMAGE SENSOR, AND SELF-CHECKING METHOD OF THE IMAGE SENSOR

(71) Applicant: SMARTSENS TECHNOLOGY (HK) CO., LIMITED, Hong Kong (CN)

(72) Inventor: Guang Yang, Shanghai (CN)

(73) Assignee: SMARTSENS TECHNOLOGY (HK) CO., LIMITED, Hong Kong (CN)

( * ) Notice: Subject to any disclaimer, the term of this patent is extended or adjusted under 35 U.S.C. 154(b) by 0 days.

(21) Appl. No.: 17/845,966

(22) Filed: Jun. 21, 2022

(65) Prior Publication Data

US 2023/0108630 A1    Apr. 6, 2023

(30) Foreign Application Priority Data

Sep. 30, 2021 (CN) ........................ 202111165044.6
Sep. 30, 2021 (CN) ........................ 202122405458.3

(51) Int. Cl.
| | |
|---|---|
| *H04N 25/75* | (2023.01) |
| *H04N 25/46* | (2023.01) |
| *H04N 25/77* | (2023.01) |
| *H04N 25/683* | (2023.01) |
| *H04N 25/633* | (2023.01) |

(52) U.S. Cl.
CPC ............ *H04N 25/75* (2023.01); *H04N 25/46* (2023.01); *H04N 25/77* (2023.01)

(58) Field of Classification Search
CPC ...... H04N 25/63; H04N 25/68; H04N 25/683; H04N 25/633; H04N 25/75; H04N 25/78; H04N 25/77; H04N 25/69; H04N 25/703; H04N 25/46
See application file for complete search history.

(56) References Cited

U.S. PATENT DOCUMENTS

| | | | | |
|---|---|---|---|---|
| 10,819,928 | B2* | 10/2020 | Mikes | H04N 25/65 |
| 2007/0206238 | A1* | 9/2007 | Kawai | H04N 25/63 |
| | | | | 358/482 |
| 2007/0216791 | A1* | 9/2007 | Oshima | H04N 25/713 |
| | | | | 348/323 |
| 2009/0160752 | A1* | 6/2009 | Meynants | H04N 25/76 |
| | | | | 348/247 |
| 2013/0265066 | A1* | 10/2013 | Hsieh | H04N 25/65 |
| | | | | 324/750.01 |
| 2016/0366402 | A1* | 12/2016 | Myers | H04N 25/75 |

(Continued)

*Primary Examiner* — Marly S Camargo
(74) *Attorney, Agent, or Firm* — Cheng-Ju Chiang

(57) ABSTRACT

A pixel array, an image sensor, and a self-checking method of the image sensor are provided. The pixel array includes a photosensitive pixel region, a first reference pixel region and/or a second reference pixel region; the photosensitive pixel region includes M rows and N columns of pixels arranged in an array; the first reference pixel region includes n columns of first reference pixels disposed corresponding to N columns of pixels of the photosensitive pixel region; the second reference pixel region includes m rows of the second reference pixels disposed corresponding to the M rows of pixels of the photosensitive pixel region. The first reference pixel region and/or the second reference pixel region can be used to implement a real-time self-checking function of the readout circuit and/or the control circuit in the image sensor, check in real time whether the image signal output by the image sensor is correct.

14 Claims, 4 Drawing Sheets

(56) References Cited

U.S. PATENT DOCUMENTS

| | | | |
|---|---|---|---|
| 2019/0379853 A1* | 12/2019 | Kawazu | H04N 25/75 |
| 2021/0058575 A1* | 2/2021 | Niwa | H04N 25/76 |
| 2021/0258563 A1* | 8/2021 | Zhan | H04N 25/75 |
| 2022/0368842 A1* | 11/2022 | Okada | H04N 25/583 |

* cited by examiner

PIXEL ARRAY, IMAGE SENSOR, AND SELF-CHECKING METHOD OF THE IMAGE SENSOR

CROSS-REFERENCE TO RELATED APPLICATION

The present application is based on and claims the priority of Chinese patent application Nos. 202111165044.6 and 202122405458.3, both filed on Sep. 30, 2021. The entire disclosure of the above-identified applications is incorporated herein by reference.

TECHNICAL FIELD

The disclosure relates to the technical field of image sensor technologies, and in particular, to a pixel array, an image sensor, and a self-checking method of the image sensor.

BACKGROUND

Image sensors are widely used in a variety of electronic devices to capture and identify image information of people or scenes, such as video surveillance systems, smart phones, digital cameras, drones, smart AI, and face recognition. Image sensors are semiconductor-based sensors that generate electrical signals in response to light, and as an important part of digital cameras, they can convert incident light signals into charge signals, then convert the charge signals into voltage or current signals, and finally output the converted electrical signal.

With the continuous intelligentization of the automobile industry, more and more image sensors are applied to automobiles. In order to ensure the safety of the entire automotive system, especially for cars with driver assistance technology, image sensors, as the core electronic components, need to have higher safety performance requirements.

Currently, an image sensor does not have the corresponding self-checking function, and cannot meet an index requirement of functional failure and diagnostic coverage ratio. When applied in automotive systems, the lack of self-checking function of image sensors may lead to major safety accidents.

The foregoing description is intended to provide general background information and does not necessarily constitute prior art.

SUMMARY

Embodiments provide a pixel array, an image sensor, and a self-checking method of the image sensor, to realize a real-time self-checking function of a readout circuit and/or a control circuit of the image sensor, and the real-time self-checking function can check whether an image signal output by the image sensor is correct in real-time, thereby improving the safety performance of the image sensor and enhancing the competitiveness of products.

According to a first aspect, a pixel array is provided. The pixel array includes:

a photosensitive pixel region including M rows and N columns of pixels arranged in an array, wherein the pixels are used for outputting pixel data through a readout circuit under the control of a control circuit to obtain an image signal; and a first reference pixel region including n columns of first reference pixels corresponding to the N columns of pixels of the photosensitive pixel region, and each of the first reference pixels is used for receiving a corresponding first input signal, and outputting a corresponding first output signal through the readout circuit, in which the first input signal and the first output signal are used for determining whether the state of the readout circuit is normal, wherein the n is less than or equal to the N, and the n and the N are natural numbers greater than 0; and/or, a second reference pixel region including m rows of second reference pixels corresponding to the M rows of pixels in the photosensitive pixel region, and each of the second reference pixels is used for receiving a corresponding second input signal, and outputting a corresponding second output signal through the readout circuit under the control of the control circuit, in which the second input signal and the second output signal are used for determining whether the state of the control circuit is normal, wherein the m is less than or equal to the M, and the m and the M are natural numbers greater than 0.

In a possible implementation, the first reference pixel region includes at least two rows and n columns of the first reference pixels corresponding to the N columns of pixels of the photosensitive pixel region; and/or, the second reference pixel region includes m rows and at least two columns of the second reference pixels corresponding to the M rows of pixels of the photosensitive pixel region.

In a possible implementation, the first reference pixel region further includes at least one first clamping voltage line for providing the first input signal for each of the first reference pixels, wherein the number of the first clamping voltage lines is less than or equal to the number of the first reference pixels; and/or, the second reference pixel region further includes at least one second clamping voltage line for providing the second input signal for each of the second reference pixels; wherein the number of the second clamping voltage lines is less than or equal to the number of the second reference pixels.

In a possible implementation, the first reference pixels sharing the same readout sub-circuit in the same row of the first reference pixels are connected to different first clamping voltage lines; and/or, the second reference pixels sharing the same control sub-circuit in the same column of the second reference pixels are connected to different second clamping voltage lines.

In a possible implementation, the first reference pixel is physically connected to the selected first clamping voltage line; or the first reference pixel is electrically connected to the corresponding first clamping voltage line through a first switch element; and/or, the second reference pixel is physically connected to the selected second clamping voltage line; or the second reference pixel is electrically connected to the corresponding second clamping voltage line through a second switch element.

In a possible implementation, structures of the first reference pixel and the second reference pixel are the same.

In a possible implementation, the first reference pixel includes a first pixel selection transistor and a first source follower transistor; and/or, the second reference pixel includes a second a pixel selection transistor and a second source follower transistor;

wherein a gate of the first source follower transistor is configured to receive the corresponding first input signal, and a drain of the first source follower transistor is coupled to a first power supply voltage, and a source of the first source follower transistor is coupled to a drain of the first pixel selection transistor; the gate of the first pixel selection transistor is configured to receive a pixel selection signal, and a source of the first pixel selection transistor is coupled to a corresponding column line to output the corresponding first output signal through the readout circuit; and, a gate of the second source follower transistor is configured to receive the corresponding second input signal, and a drain of the second source follower transistor is coupled to a second power supply voltage, and a source of the second source follower transistor is coupled to a drain of the second pixel selection transistor; the gate of the second pixel selection transistor is configured to receive the pixel selection signal, and a source of the second pixel selection transistor is coupled to the corresponding column line to output the corresponding second output signal through the readout circuit.

In a possible implementation, the number of the first source follower transistors is at least two, and the first source follower transistors are arranged in parallel; and/or, the number of the second source follower transistors is at least two, and the second source follower transistors are arranged in parallel.

According to a second aspect, an image sensor is provided. The image sensor includes the pixel array provided in any one of the first aspect or the optional manners of the first aspect.

In a possible implementation, the image sensor includes the readout circuit and the control circuit; and, wherein, the control circuit includes a pixel drive circuit configured to output a pixel selection signal to select any pixel of the pixel array for production, and the readout circuit is configured to read data of the pixel selected by the pixel selection signal.

According to a third aspect, a self-checking method of the image sensor is provided, which is applied to the image sensor provided in any one of the second aspect or the optional manners of the second aspect, and as one of the embodiments, the method includes:

determining that the read circuit is in an abnormal state when the first output signal and the first input signal do not meet a preset corresponding relationship; and/or, determining that the state of the control circuit is abnormal when the second output signal and the second input signal do not meet the preset corresponding relationship, In a possible implementation, the method further includes:

outputting a pixel column address corresponding to the first output signal when the first output signal and the first input signal do not meet the preset corresponding relationship; and/or, outputting a pixel row address corresponding to the second output signal when the second output signal and the second input signal do not meet the preset corresponding relationship.

In a possible implementation, the method further includes:

when the first output signal and the first input signal do not meet the preset corresponding relationship, further determining whether the first output signal exceeds a preset range and if within the preset range, determining that a connection error occurs between the readout sub-circuits.

In a possible implementation, the preset range is greater than or equal to a first preset value and less than or equal to a second preset value; wherein, the first preset value is greater than or equal to A, and less than or equal to B, where A is a difference value between a value of a first output signal in the preset corresponding relationship and one-fourth of a value of a first output signal in the preset corresponding relationship, and B is a difference value between the value of the first output signal in the preset corresponding relationship and one-eighth of the value of the first output signal in the preset corresponding relationship; and, the second preset value is greater than or equal to C, and less than or equal to D, where C is a sum value of the value of the first output signal in the preset corresponding relationship and one-eighth of the value of the first output signal in the preset corresponding relationship, and B is a sum value of the value of the first output signal in the preset corresponding relationship and one-fourth of the value of the first output signal in the preset corresponding relationship.

In the present application, a first reference pixel region corresponding to a column of a photosensitive pixel array and/or a second reference pixel region corresponding to a row of the photosensitive pixel array are provided, when acquiring data of each frame of image of the photosensitive pixel array, the output signal of a reference pixel in the first reference pixel region and/or the second reference pixel region are acquired to perform fault detection of a readout circuit and/or a control circuit to determine whether the acquired image data is accurate. Therefore, the present application can realize the real-time self-checking function of the readout circuit and/or the control circuit in the image sensor, check whether the image signal output by the image sensor is correct in real time, improve the safety performance of the image sensor, and enhance the competitiveness of products.

BRIEF DESCRIPTION OF THE DRAWINGS

To describe the technical solutions in the embodiments more clearly, the following briefly describes the accompanying drawings for describing the embodiments. The accompanying drawings in the following descriptions show merely some embodiments, and a person of ordinary skill in the art may further derive other accompanying drawings from these accompany drawings without creative efforts.

DETAILED DESCRIPTION OF PREFERRED EMBODIMENTS

In order to make those skilled in the art better understand the technical solutions of the present application, the technical solutions in the embodiments of the present application will be clearly and completely described below with reference to the accompanying drawings in the embodiments of the present application. And exemplary embodiments of the present application are described in detail with reference to the accompanying drawings, but the present application is not limited to the following embodiments.

The terms "first", "second", "third", "fourth", etc. in the description and claims of the present application are all used for distinguishing similar objects rather than describing a particular sequence or order. Furthermore, the terms "comprising" and "having" and any variations thereof are intended to cover non-exclusive inclusion, for example, a process, method, system, product or device comprising a series of steps or units is not necessarily limited to those expressly listed steps or units, but may include other steps or units not expressly listed or inherent to these processes, methods, products or devices.

Herein, one element, port, component or part is "connected" with another element, port, component or part, it can be understood as a direct electrical connection, or it can also be understood as an indirect electrical connection with intermediate elements. Unless otherwise defined, all technical and scientific terms used herein have the same meaning as commonly understood by one of ordinary skill in the art to which this application belongs.

The image sensor includes a plurality of functional circuits, and each functional circuit can affect the image sensor to output accurate image signals. For example, an error in the readout circuit will cause the image sensor to output an erroneous image signal, and an error in a related circuit of the control circuit will also cause the image sensor to output an erroneous image signal, such as a related circuit outputting a pixel selection signal. Therefore, this application provides corresponding embodiments from different perspectives to realize the self-checking function of different functional circuits of the image sensor, and can further detect which specific subcircuit of the functional circuit has an error, for example, there is an error in the readout sub-circuit corresponding to a certain column of pixels, and there is an error in the control sub-circuit corresponding to a certain row of pixels.

Figure 1:
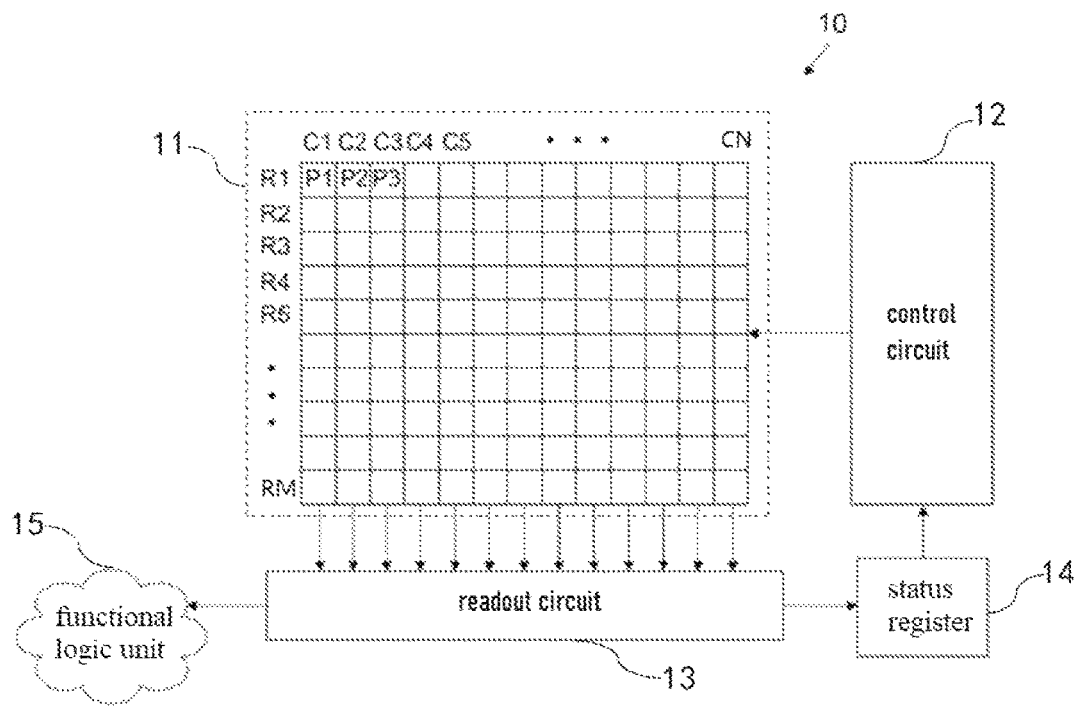
FIG. 1 is a schematic structural diagram of an existing image sensor.

Before describing the specific embodiments of the present application, the relevant functional circuits of an existing image sensor are briefly described. FIG. 1 is a schematic structural diagram of an existing image sensor. Referring to FIG. 1, the image sensor 10 may include a pixel array 11, and a control circuit 12 and a readout circuit 13 coupled to the pixel array 11. The control circuit 12 is configured to drive the pixel array 11 to generate an image signal, and the control circuit 12 includes a plurality of control sub-circuits, each of which is used to drive at least one row of pixels. The readout circuit 13 is configured to read out and convert the image signal generated by the pixel array 11 into a digital signal, and output same, such as a binary digital signal. Likewise, the readout circuit 13 includes a plurality of readout sub-circuits, each of which is configured to read out at least one column of pixels.

Specifically, the pixel array 11 may include a plurality of pixels arranged in an array along a plurality of row lines and a plurality of column lines. For example, referring to FIG. 1, the pixel array 11 may include a plurality of pixels (e.g., P1, P2, P3, etc.), and the plurality of pixels may be arranged in first to mth rows R1 to Rm and first to nth columns C1 to Cn (both M and N are positive integers). The pixel may include a photoelectric conversion element configured to generate electric charge in response to incident light, such as a photodiode, phototransistor, pinned photodiode, or the like. The control circuit 12 may include a row decoder and a row driver with a required timing circuit. The readout circuit 13 may include column decoders and column drivers with a required timing circuit. The control circuit 12 and the readout circuit 13 are also coupled to a status register 14. After each pixel acquires its image signal or image charge, the image signal is read out by the readout circuit 13 according to the readout mode set by the status register 14 and then transmitted to the functional logic unit 15. The functional logic unit 15 can store image data, or can process image data according to later image effects (e.g., crop, rotate, remove red-eye, adjust brightness, adjust contrast, or other methods), and can also perform other data processing operations as required.

The readout circuit 13 may include an amplifier circuit, an analog-to-digital conversion circuit, and the like. The status register 14 may include a digitally programmed selection system for determining the readout mode. The readout circuit 13 may read out the image signal row by row along the readout column line, or may use other techniques (not shown) to read out the image signal, such as serial readout or readout of all pixels in full parallel. Each row of the pixel array may correspond to a row driver unit (which may be a part of the control sub-circuit) configured to output a plurality of signals to the identified pixel or pixel row. For example, if the image sensor 10 includes one thousand rows of pixels, one thousand row driving units can be configured, and the plurality of control signals include pixel selection signals, row reset signals and transmission signals. When receiving each signal, the pixel array 11 may perform various functions on the identified pixels, and transfer the charge of one or more pixels in the identified row of pixels.

It can be seen from the above description that failure of each functional circuit will cause the image sensor to output an erroneous image. This application realizes the self-checking function of the readout circuit and the control circuit by improving the existing image sensor. Specific embodiments of the present application will be described in detail below.

The First Embodiment

Figure 2:
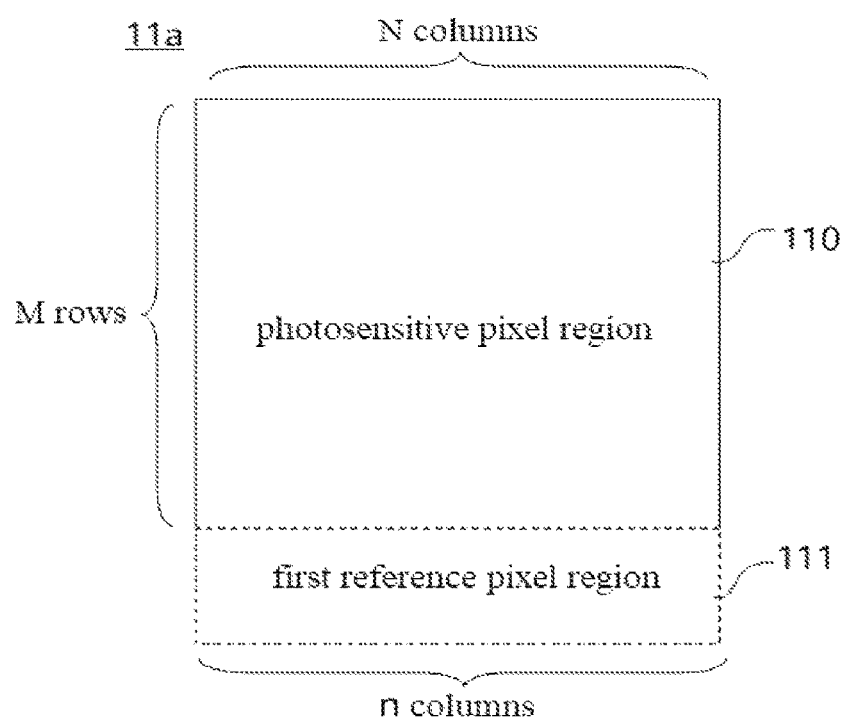
FIG. 2 is a schematic diagram of a structure of a pixel array and a connection relationship thereof according to an embodiment of the present application.

FIG. 2 is a schematic diagram of a structure of a pixel array and a connection relationship thereof according to an embodiment of the present application. Referring to FIG. 1 and FIG. 2 in combination, the pixel array 11a includes a photosensitive pixel region 110 and a first reference pixel region 111. The photosensitive pixel region 110 includes M rows and N columns of pixels arranged in an array (i.e., the pixel array 11 in FIG. 1), and is used for outputting pixel data through the readout circuit 13 to obtain image signals under the control of the control circuit 12.

The first reference pixel region 111 includes n columns of first reference pixels corresponding to the N columns of pixels of the photosensitive pixel region 110, and each of the first reference pixels is used for receiving a corresponding first input signal, and outputting a corresponding first output signal through the readout circuit 13, in which the first input signal and the first output signal are used for determining whether the state of the readout circuit 13 is normal, wherein the n is less than or equal to the N, and the n and the N are natural numbers greater than 0.

Specifically, the first reference pixel region 111 includes n columns of first reference pixels corresponding to N columns of pixels of the photosensitive pixel region 110, and each column of first reference pixels of the first reference pixel region 111 outputs signals through the same readout sub-circuit as the corresponding column of pixels of the photosensitive pixel region 110. The readout sub-circuit may include components such as a column-level ADC (e.g., Analog to Digital Converter) corresponding to each column of pixels in the readout circuit 13. It is worth mentioning that each column of the first reference pixel in the first reference pixel region 111 and the pixels in the corresponding column of the photosensitive pixel region 110 output signals through the same readout sub-circuit, not only meaning that one column of pixels corresponds to one readout sub-circuit, but also meaning that multiple columns of pixels correspond to the same readout sub-circuit.

The number of pixel columns n of the first reference pixel region 111 may be less than or equal to the number of pixel columns N of the photosensitive pixel region 110. Preferably, n is equal to N, that is, the function of the readout sub-circuit corresponding to each column of photosensitive pixels can be checked by using different signals.

For example, by performing signal encoding on each column of first reference pixels, a unique row encoding can be predetermined, that is, the input signal of each first reference pixel in one row is encoded and set, for example, n columns of first reference pixels in one row form an n-digit a-ary number, for example, a ten-digit binary number, and the corresponding n-digit a-ary number is pre-stored in the image sensor. For the first reference pixel, the first output signal of the first reference pixel is also read when the image sensor reads out the signal, and the image sensor can determine whether or not the state of the readout circuit 13 is normal by comparing the readout data with the n-digit a-ary number stored in advance. For example, when the readout data does not correspond to the pre-stored a-ary number, it is determined that the state of the readout circuit 13 is abnormal, furthermore, an erroneous pixel address (i.e., column address) can be output, and an erroneous readout sub-circuit can also be determined.

It is worth mentioning that the pre-stored a-ary number can represent the preset output signal corresponding to the first reference pixel under the control of the selected first clamping voltage.

Each first reference pixel of the first reference pixel region 111 also needs to be read out through the readout circuit 13 under the control of the corresponding control unit. Therefore, each first reference pixel is configured with a corresponding pixel address, and a corresponding row line and a corresponding control unit are also added to the hardware part. The control unit corresponding to the first reference pixel region 111 may be integrated in the existing control circuit 12, or may be provided separately.

It should be noted that, it can be determined whether the state of the readout circuit 13 is normal by a determination module according to the first input signal and the first output signal, and the determination module can be integrated into the functional logic unit 15.

In a possible embodiment, the first reference pixel region 111 includes two rows and n columns of first reference pixels corresponding to the N columns of pixels of the photosensitive pixel region 110. Specifically, for the consideration of cost and self-check accuracy, the first reference pixel region 111 includes two rows and n columns of first reference pixels, which can avoid that when there is only one row of first reference pixels, the errors of the first reference pixels themselves lead to false judgments in the self-check of the corresponding readout circuit 13. In this embodiment, when the first output signals of the two rows of first reference pixels corresponding to the photosensitive pixel region 110 do not correspond to the corresponding first input signals, it is determined that the corresponding readout sub-circuit is invalid.

In a possible embodiment, the first reference pixel region 111 further includes at least one first clamping voltage line for providing a first input signal for each first reference pixel; wherein the number of the first clamping voltage lines is less than or equal to that of the first reference pixels. Specifically, the first clamping voltage line is used to connect the first reference pixel and provide it with the first input signal. According to different encoding methods, for example, to set different encodings for each first reference pixel in the same row, that is, to set different first input signals, the number of first clamping voltage lines needs to be equal to the number of first reference pixels of a row.

In a possible embodiment, the first reference pixels sharing the same readout sub-circuit in the same row of the first reference pixels are connected to different first clamping voltage lines. Specifically, by connecting the first reference pixels sharing the same readout subcircuit in the same row of first reference pixels to different first clamping voltage lines, one readout sub-circuit can be detected using different clamping voltages.

In a possible embodiment, the first reference pixel is physically connected to the selected first clamping voltage line; or, the first reference pixel is electrically connected to the corresponding first clamping voltage line through a first switch element. Specifically, when the voltage on the first clamping voltage line is variable, the first reference pixel is physically connected to the selected first clamping voltage line, so that switching of various first input signals can be realized. When the voltage on the first clamping voltage line is fixed, the first reference pixel and the corresponding first clamping voltage line can be electrically connected through the first switch element, so as to switch different first input signals. In addition, the flexible matching between the reference pixel and the clamping voltage line can also be implemented more flexibly based on the first switch element.

Figure 3:
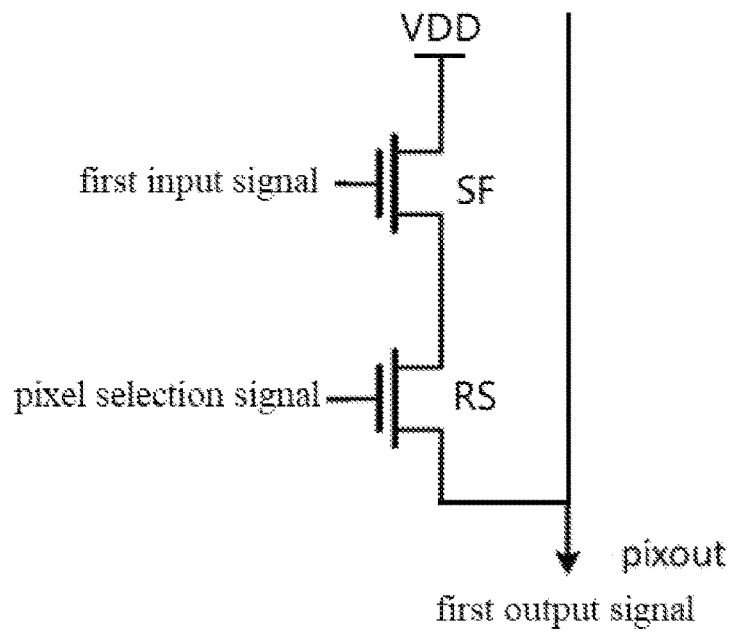
FIG. 3 is a schematic structural diagram of a first reference pixel according to an embodiment of the present application.

FIG. 3 is a schematic structural diagram of a first reference pixel according to an embodiment of the present application. Referring to FIG. 3, the first reference pixel includes a first source follower transistor SF and a first pixel selection transistor RS; wherein a gate of the first source follower transistor SF is configured to receive the corresponding first input signal, and a drain of the first source follower transistor SF is coupled to a first power supply voltage, and a source of the first source follower transistor SF is coupled to a drain of the first pixel selection transistor RS; the gate of the first pixel selection transistor RS is configured to receive a pixel selection signal output by the control circuit 12, and a source of the first pixel selection transistor RS is coupled to a corresponding column line to output the corresponding first output signal through the readout circuit 13.

Figure 4:
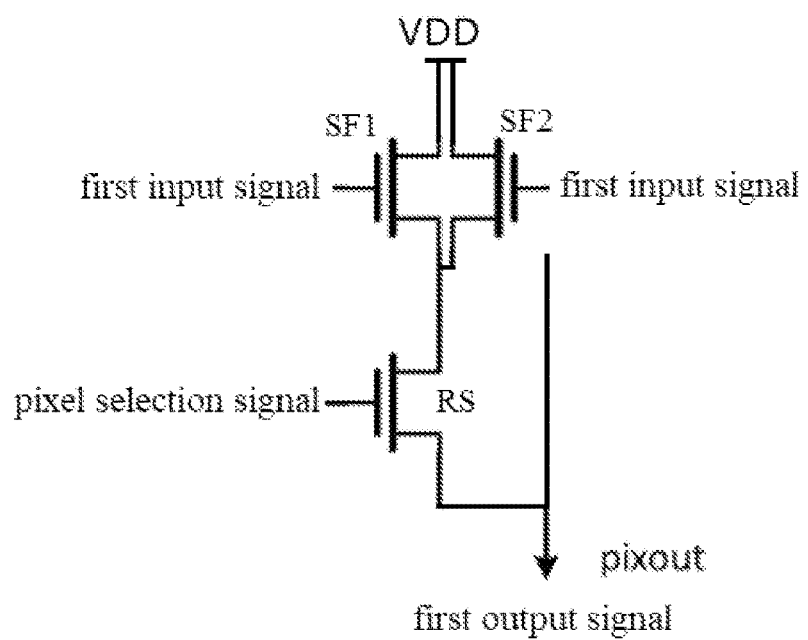
FIG. 4 is a schematic structural diagram of a first reference pixel according to another embodiment of the present application.

FIG. 4 is a schematic structural diagram of a first reference pixel according to another embodiment of the present application. Referring to FIG. 4, the first reference pixel includes at least two first source follower transistors (e.g., SF1 and SF2) and a first pixel selection transistor RS, and the at least two first source follower transistors are arranged in parallel.

Specifically, the gate of the first source follower transistor (e.g., SF1 or SF2) receive the corresponding first input signal, the drain of the first source follower transistor is coupled to the first power supply voltage VDD, and the source of the first source follower transistor is coupled to the drain of the first pixel selection transistor RS; the gate of the first pixel selection transistor RS receives the pixel selection signal output by the control circuit 12, and a source of the first pixel selection transistor RS is coupled to a corresponding column line to output the corresponding first output signal through the readout circuit 13.

The first reference pixel in this embodiment can implement switching of different first input signals through hardware. For example, the corresponding first input signal received by the gate of the first source transistor SF1 is 3V, and the corresponding first input signal received by the gate of the second source transistor SF2 is 4V, then different input signals can be set for the first reference pixel.

In a possible embodiment, the first reference pixel includes at least two first source follower transistors and at least two pixel select transistors, and the number of the first source follower transistors is the same as the number of pixel select transistors, and each source follower transistor is provided corresponding to each pixel selection transistor. Specifically, this embodiment adds a pixel selection transistor on the basis of the solution shown in FIG. 4, so that each first reference pixel has multiple groups of mutually independent output paths.

In conclusion, the pixel array provided in the above embodiments can be used to implement a real-time self-checking function of the readout circuit in the image sensor, check in real time whether the image signal output by the image sensor is correct, improve the security performance of the image sensor, and improve product competitiveness.

The Second Embodiment

Figure 5:
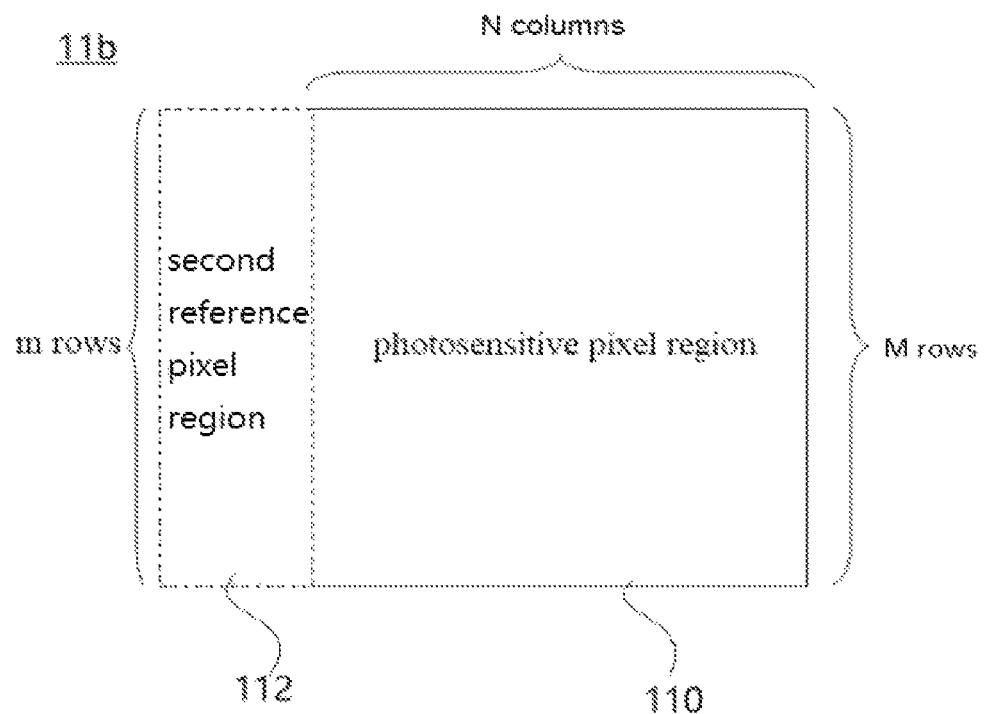
FIG. 5 is a schematic diagram of a structure of a pixel array and a connection relationship thereof according to another embodiment of the present application.

FIG. 5 is a schematic diagram of a structure of a pixel array and a connection relationship thereof according to another embodiment of the present application. Referring to FIG. 1 and FIG. 5 in combination, the pixel array 11b includes a photosensitive pixel region 110 and a second reference pixel region 112. The photosensitive pixel region 110 includes M rows and N columns of pixels arranged in an array, and is used for outputting pixel data through the readout circuit 13 to obtain image signals under the control of the control circuit 12. The second reference pixel region 112 includes m rows of second reference pixels corresponding to the M rows of pixels of the photosensitive pixel region 110, and each of the second reference pixels is used for receiving a corresponding second input signal, and outputting a corresponding second output signal through the readout circuit 13, in which the second input signal and the second output signal are used for determining whether the state of the control circuit 12 is normal, wherein the m is less than or equal to the M, and the m and the M are natural numbers greater than 0.

Specifically, the second reference pixel region 112 includes m rows of second reference pixels corresponding to M rows of pixels of the photosensitive pixel region 110. The second reference pixels in each row of the second reference pixel region 112 and the pixels in the same row of the photosensitive pixel region 110 are gated through the same row line and the same pixel selection signal, and are read out by the corresponding readout sub-circuit through the corresponding column line. The readout sub-circuit may include components such as a column-level ADC corresponding to each column of pixels in the readout circuit 13. The pixel selection signal here is output to the corresponding row line by the row driver in the control circuit 12.

The number of pixel columns m of the second reference pixel region 112 may be less than or equal to the number of pixel columns M of the photosensitive pixel region 110. Preferably, m is equal to M, that is, the pixel selection signal of each row of pixels can be checked.

For example, by performing signal encoding on each row of second reference pixels, a unique column encoding can be predetermined, that is, the input signal of each second reference pixel in one column is encoded and set, for example, m rows of second reference pixels in one column form an m-digit a-ary number, for example, a ten-digit binary number, and the corresponding m-digit a-ary number is pre-stored in the image sensor. For the second reference pixel, the second output signal of the second reference pixel is also read when the image sensor reads out the signal, and the image sensor can determine whether or not the state of the control circuit 12 is normal by comparing the readout data with the m-digit a-ary number stored in advance. For example, when the readout data does not correspond to the pre-stored a-ary number, it is determined that the state of the control circuit 12 is abnormal, furthermore, an erroneous pixel address (i.e., row address) can be output, and an erroneous row driver circuit can also be determined. For example, when the second pixel region includes a column of M rows of second reference pixels, each row of the photosensitive pixel array has a corresponding second reference pixel, and the second reference pixel and the corresponding row of pixels are gated by the same pixel selection signal. When the second output signal of the second reference pixel does not correspond to the second input signal, it indicates that the pixel selection signal is wrong, and it can also be judged that the image signal output by the corresponding gated pixel in the photosensitive pixel array is wrong.

It is worth mentioning that each second reference pixel in the second reference pixel region 112 is also read out by the readout circuit 13 under the control of the control circuit 12, and each second reference pixel is configured with a corresponding pixel address. Furthermore, corresponding column lines and corresponding readout sub-circuits of the readout circuit 13 are also added to the hardware part of the image sensor.

It should be noted that, it can be determined whether the state of the control circuit 12 is normal by a determination module according to the second input signal and the second output signal, and the determination module can be integrated into the functional logic unit 15.

In a possible embodiment, the first reference pixel region 111 includes two rows and n columns of first reference pixels corresponding to the N columns of pixels of the photosensitive pixel region 110. Specifically, for the consideration of cost and self-check accuracy, the second reference pixel region 112 includes two columns and m rows of second reference pixels, which can avoid that when there is only one column of second reference pixels, the errors of the second reference pixels themselves lead to false judgments in the self-check of the corresponding control circuit 12, which specifically refers to the row drive circuit in the control circuit 12. In this embodiment, when the second output signals of the two columns of second reference pixels corresponding to the photosensitive pixel region 110 do not correspond to the corresponding second input signals, it is determined that the corresponding control circuit 12 is invalid.

In a possible embodiment, the second reference pixel region 112 further includes at least one second clamping voltage line for providing a second input signal for each second reference pixel; wherein the number of the second clamping voltage lines is less than or equal to that of the second reference pixels.

Specifically, the second clamping voltage line is used to connect the second reference pixel and provide it with the second input signal. According to different encoding methods, for example, to set different encodings for each second reference pixel in the same column, that is, to set different second input signals, the number of second clamping voltage lines needs to be equal to the number of second reference pixels of a column. In other embodiments, the input voltage on the second clamping voltage line can also be changed, so that the voltage can also be input to a column of second reference pixels through a second clamping voltage line. In addition, for the second reference pixel, when encoding each of the second reference pixels, if the number of the second clamping voltage lines having a fixed input voltage is a, accordingly, results of each of the second reference pixels performing quantization output by the readout circuit 13 may have one or more choices, for example, three choices. There are various ways of encoding data here, which will not be described one by one here.

In a possible embodiment, the second reference pixels sharing the same control sub-circuit in the same column of the second reference pixels are connected to different second clamping voltage lines. Specifically, by connecting the second reference pixels sharing the same control sub-circuit in the same column of second reference pixels to different second clamping voltage lines, one control sub-circuit can be detected using different clamping voltages.

In a possible embodiment, the second reference pixel is physically connected to the selected second clamping voltage line; or, the second reference pixel is electrically connected to the corresponding second clamping voltage line through a second switch element. Specifically, when the voltage on the second clamping voltage line is variable, the second reference pixel is physically connected to the selected second clamping voltage line, so that switching of various second input signals can be realized. When the voltage on the second clamping voltage line is fixed, the second reference pixel and the corresponding second clamping voltage line can be electrically connected through the second switch element, so as to switch different second input signals. In addition, the flexible matching between the reference pixel and the clamping voltage line can also be implemented more flexibly based on the second switch element.

In a possible embodiment, the structure of the second reference pixel is the same as that of the first reference pixel. The second reference pixel includes a second source follower transistor and a second pixel selection transistor; wherein a gate of the second source follower transistor is configured to receive the corresponding second input signal, and a drain of the second source follower transistor is coupled to a second power supply voltage, and a source of the second source follower transistor is coupled to a drain of the second pixel selection transistor; the gate of the second pixel selection transistor is configured to receive a pixel selection signal output by the control circuit 12, and a source of the second pixel selection transistor is coupled to a corresponding column line to output the corresponding second output signal through the readout circuit 13.

In a possible embodiment, the second reference pixel includes at least two second source follower transistors and a second pixel selection transistor, and the at least two second source follower transistors are arranged in parallel. Specifically, the gate of the second source follower transistor receive the corresponding second input signal, the drain of the second source follower transistor is coupled to the second power supply voltage, and the source of the second source follower transistor is coupled to the drain of the second pixel selection transistor; the gate of the second pixel selection transistor receives the pixel selection signal output by the control circuit 12, and a source of the second pixel selection transistor is coupled to a corresponding column line to output the corresponding second output signal through the readout circuit 13.

It should be noted that, for the undescribed part of the specific structure of the second reference pixel, reference may be made to the implementation manners and related drawings of the first reference pixel in the first embodiment, which will not be repeated in the second embodiment.

The second reference pixel in this embodiment can also implement switching of different second input signals by means of hardware.

In conclusion, the pixel array provided in the above embodiments can be used to implement a real-time self-checking function of the control circuit in the image sensor, check in real time whether the image signal output by the image sensor is correct, improve the security performance of the image sensor, and improve product competitiveness.

The Third Embodiment

Figure 6:
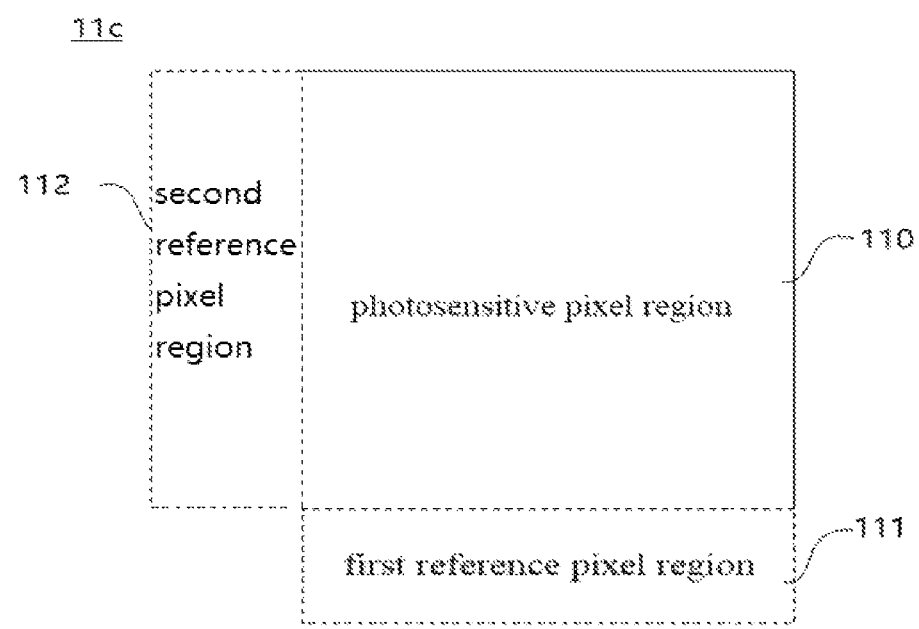
FIG. 6 is a schematic diagram of a structure of a pixel array and a connection relationship thereof according to the other embodiment of the present application.

FIG. 6 is a schematic diagram of a structure of a pixel array and a connection relationship thereof according to the other embodiment of the present application. Referring to FIG. 6, the pixel array 11c includes a photosensitive pixel region 110, a first reference pixel region 111 and a second reference pixel region 112.

The photosensitive pixel region 110 includes M rows and N columns of pixels arranged in an array (i.e., the pixel array 11 in FIG. 1), and is used for outputting pixel data through the readout circuit 13 to obtain image signals under the control of the control circuit 12.

The first reference pixel region 111 includes n columns of first reference pixels corresponding to the N columns of pixels of the photosensitive pixel region 110, and each of the first reference pixels is used for receiving a corresponding first input signal, and outputting a corresponding first output signal through the readout circuit 13, in which the first input signal and the first output signal are used for determining whether the state of the readout circuit 13 is normal, wherein the n is less than or equal to the N, and the n and the N are natural numbers greater than 0.

The second reference pixel region 112 includes m rows of second reference pixels corresponding to the M rows of pixels of the photosensitive pixel region 110, and each of the second reference pixels is used for receiving a corresponding second input signal, and outputting a corresponding second output signal through the readout circuit 13, in which the second input signal and the second output signal are used for determining whether the state of the control circuit 12 is normal, wherein the m is less than or equal to the M, and the m and the M are natural numbers greater than 0.

The first reference pixel region 111 and the second reference pixel region 112 are also included in this embodiment, and the detailed description thereof may refer to the above embodiments, and will not be repeated here.

The pixel array provided in the above embodiments can be used to implement a real-time self-checking function of the control circuit and the readout circuit in the image sensor, check in real time whether the image signal output by the image sensor is correct, improve the security performance of the image sensor, and improve product competitiveness.

The Fourth Embodiment

Referring to FIG. 2, FIG. 5 and FIG. 6 in combination, this embodiment provides an image sensor including the pixel array of any one of the above embodiments (i.e., 11a, 11b, or 11c).

Specifically, the pixel array includes a first reference pixel region 111 and/or a second reference pixel region 112 for judging whether the state of the readout circuit 12 and/or the control circuit 13 is normal.

In a possible embodiment, the image sensor further includes a control circuit 12 and a readout circuit 13, wherein the control circuit 12 includes a pixel drive circuit, and the pixel drive circuit is used for outputting a pixel selection signal to select any row in the pixel array to output; the readout circuit 13 is used to read the data of the pixel selected by the pixel selection signal.

In a possible embodiment, the image sensor further includes a determination module for determining whether the state of the readout circuit 13 is normal according to the first input signal and the first output signal, and/or determining whether the state of the control circuit 12 is normal according to the second input signal and the second output signal.

For other specific parts, reference may be made to the foregoing embodiments, and no further details are provided herein.

The image sensor provided in the above embodiments can be used to implement a real-time self-checking function of the control circuit and/or the readout circuit, check in real time whether the image signal output by the image sensor is correct, improve the security performance of the image sensor, and improve product competitiveness.

The Fifth Embodiment

This embodiment provides a self-checking method for an image sensor, which is applied to the image sensor in any of the above embodiments, wherein the method includes:

determining that the read circuit is in an abnormal state when the first output signal and the first input signal do not meet a preset corresponding relationship; and/or, determining that the state of the control circuit is abnormal when the second output signal and the second input signal do not meet the preset corresponding relationship.

Specifically, for example, an abnormal state of the readout circuit may include two cases, one is that a problem occurs in a read sub-circuit itself, and the other is that the read sub-circuits have no problem, but the corresponding column lines are connected in error, for example, two adjacent read sub-circuits are connected in error with the corresponding column lines.

In a possible embodiment, the method further includes:

outputting a pixel column address corresponding to the first output signal when the first output signal and the first input signal do not meet the preset corresponding relationship; and/or, outputting a pixel row address corresponding to the second output signal when the second output signal and the second input signal do not meet the preset corresponding relationship.

Figure 7:
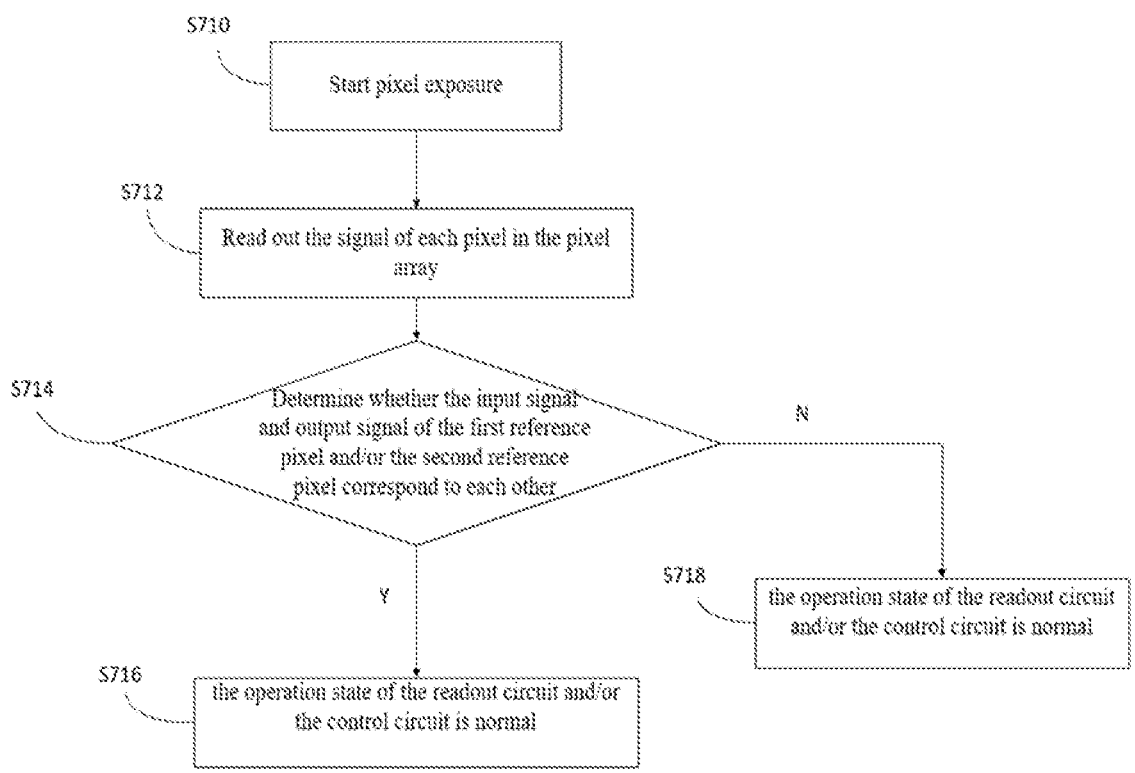
FIG. 7 is a schematic diagram of a self-checking process of an image sensor according to an embodiment of the present application.

Specifically, in order to better understand the technical solution, please refer to FIG. 7, FIG. 7 is a schematic diagram of a self-checking process of an image sensor according to an embodiment of the present application.

As shown in FIG. 7, after the image sensor is powered on, in step S710, it starts to expose pixels. And in step S712, the signals of the pixels in the pixel array are then read out. Then, in step S714, the input signal and the output signal of the first reference pixel and/or the second reference pixel are respectively compared and judged to determine whether the input signal and output signal of the first reference pixel and/or the second reference pixel correspond to each other.

Then, in step S716, When the corresponding relationship between the input signal and the output signal of the first reference pixel and/or the second reference pixel is correct, it is determined that the readout circuit and/or the control circuit are in a normal state. And in step S718, when there is an error in the correspondence between the input signal and the output signal of the first reference pixel and/or the second reference pixel, it is determined that the readout circuit and/or the control circuit is in an abnormal state, the address of the wrong column or row is output, and an alarm signal can be further output.

In a possible embodiment, the method further includes:

when the first output signal and the first input signal do not meet the preset corresponding relationship, further determining whether the first output signal exceeds a preset range and if within the preset range, determining that a connection error occurs between the readout sub-circuits.

Specifically, when the first output signal does not exceed the preset range, that is, the output deviation is relatively small, it may be determined that a problem occurs in the connection of the read sub-circuits. If the output deviation exceeds the preset range, the connection may be a problem or a problem occurs in the read sub-circuits themselves.

In a possible embodiment, the preset range is greater than or equal to a first preset value and less than or equal to a second preset value, wherein, the first preset value is greater than or equal to A, and less than or equal to B, where A is a difference value between a value of a first output signal in the preset corresponding relationship and one-fourth of a value of a first output signal in the preset corresponding relationship, and B is a difference value between the value of the first output signal in the preset corresponding relationship and one-eighth of the value of the first output signal in the preset corresponding relationship; And the second preset value is greater than or equal to C, and less than or equal to D, where C is a sum value of the value of the first output signal in the preset corresponding relationship and one-eighth of the value of the first output signal in the preset corresponding relationship, and B is a sum value of the value of the first output signal in the preset corresponding relationship and one-fourth of the value of the first output signal in the preset corresponding relationship.

Specifically, for example, when the first input signal of the first reference pixel is 2V, the first output signal in the preset corresponding relationship should be 4V, then A is 3 at this time, that is, $4-4*(1/4)=3$, B is 3.5, that is, $4-4(1/8)=3.5$, C is 4.5, that is, $4+4*(1/8)=4.5$, D is 5, that is, $4+4(1/4)=5$. That is, the preset range is (3~3.5) to (4.5~5), the lower limit of the preset range is (3~3.5), and the upper limit of the preset range is (4.5~5).

It should be noted that, for the places that are not described or described in detail in this embodiment of the method, please refer to the description of the foregoing embodiment, which will not be repeated here.

The self-checking method of the image sensor provided in the above embodiments can be used to implement a real-time self-checking function of the control circuit and/or the readout circuit, check in real time whether the image signal output by the image sensor is correct, improve the security performance of the image sensor, and improve product competitiveness.

In the description of the specification, terms such as "an embodiment", "an embodiment", "an example" or "a specific example" and the like mean that a particular feature, structure, material or characteristic described in connection with the embodiment, manner or example is included in at least one embodiment, embodiment or example of the present invention. In this specification, schematic representations of the above terms are not necessarily directed to the same embodiment, implementation or example. Furthermore, the particular features, structures, materials or characteristics described may be combined in any suitable manner in one or more embodiments. Furthermore, those skilled in the art may combine and combine the different embodiments, implementations or examples described in this specification.

The above descriptions are only preferred embodiments of the present invention, and are not intended to limit the present invention. For those skilled in the art, the present invention may have various modifications and changes. Any modification, equivalent replacement, improvement, etc. made within the spirit and principle of the present invention shall be included within the protection scope of the present invention. It should be noted that like numerals and letters refer to like items in the following figures, so once an item is defined in one figure, it does not require further definition and explanation in subsequent figures.

What is claimed is:

1. A pixel array, wherein the pixel array comprises:
a photosensitive pixel region comprising M rows and N columns of pixels arranged in an array, wherein the pixels are used for outputting pixel data through a readout circuit under the control of a control circuit to obtain an image signal; and
a first reference pixel region comprising n columns of first reference pixels corresponding to the N columns of pixels of the photosensitive pixel region, and each of the first reference pixels is used for receiving a corresponding first input signal, and outputting a corresponding first output signal through the readout circuit, in which the first input signal and the first output signal are used for determining whether the state of the readout circuit is normal, wherein the n is less than or equal to the N, and the n and the N are natural numbers greater than 0; and/or,
a second reference pixel region comprising m rows of second reference pixels corresponding to the M rows of pixels in the photosensitive pixel region, and each of the second reference pixels is used for receiving a corresponding second input signal, and outputting a corresponding second output signal through the readout circuit under the control of the control circuit, in which the second input signal and the second output signal are used for determining whether the state of the control circuit is normal, wherein the m is less than or equal to the M, and the m and the M are natural numbers greater than 0.

2. The pixel array of claim 1, wherein the first reference pixel region comprises at least two rows and n columns of the first reference pixels corresponding to the N columns of pixels of the photosensitive pixel region; and/or, the second reference pixel region comprises m rows and at least two columns of the second reference pixels corresponding to the M rows of pixels of the photosensitive pixel region.

3. The pixel array of claim 1, wherein the first reference pixel region further comprises at least one first clamping voltage line for providing the first input signal for each of the first reference pixels, wherein the number of the first clamping voltage lines is less than or equal to the number of the first reference pixels; and/or, the second reference pixel region further comprises at least one second clamping voltage line for providing the second input signal for each of the second reference pixels, wherein the number of the second clamping voltage lines is less than or equal to the number of the second reference pixels.

4. The pixel array of claim 3, wherein the first reference pixels sharing the same readout sub-circuit in the same row of the first reference pixels are connected to different first clamping voltage lines; and/or, the second reference pixels sharing the same control sub-circuit in the same column of the second reference pixels are connected to different second clamping voltage lines.

5. The pixel array of claim 1, wherein the first reference pixel is physically connected to the selected first clamping voltage line; or the first reference pixel is electrically connected to the corresponding first clamping voltage line through a first switch element; and/or, the second reference pixel is physically connected to the selected second clamping voltage line; or the second reference pixel is electrically connected to the corresponding second clamping voltage line through a second switch element.

6. The pixel array of claim 1, wherein structures of the first reference pixel and the second reference pixel are the same.

7. The pixel array of claim 1, wherein the first reference pixel comprises a first pixel selection transistor and a first source follower transistor; and/or, the second reference pixel comprises a second a pixel selection transistor and a second source follower transistor;
wherein a gate of the first source follower transistor is configured to receive the corresponding first input signal, and a drain of the first source follower transistor is coupled to a first power supply voltage, and a source of the first source follower transistor is coupled to a drain of the first pixel selection transistor; the gate of the first pixel selection transistor is configured to receive a pixel selection signal, and a source of the first pixel selection transistor is coupled to a corresponding column line to output the corresponding first output signal through the readout circuit;
a gate of the second source follower transistor is configured to receive the corresponding second input signal, and a drain of the second source follower transistor is coupled to a second power supply voltage, and a source of the second source follower transistor is coupled to a drain of the second pixel selection transistor; the gate of the second pixel selection transistor is configured to receive the pixel selection signal, and a source of the second pixel selection transistor is coupled to the corresponding column line to output the corresponding second output signal through the readout circuit.

8. The pixel array of claim 7, wherein the number of the first source follower transistors is at least two, and the first source follower transistors are arranged in parallel; and/or, the number of the second source follower transistors is at least two, and the second source follower transistors are arranged in parallel.

9. An image sensor comprising the pixel array of claim 1.

10. The image sensor of claim 9, wherein the image sensor comprises the readout circuit and the control circuit;
wherein, the control circuit comprises a pixel drive circuit configured to output a pixel selection signal to select any pixel of the pixel array for production, and the readout circuit is configured to read data of the pixel selected by the pixel selection signal.

11. A self-checking method for an image sensor, which is applied to the image sensor of claim 9, wherein the method comprises:
determining that the read circuit is in an abnormal state when the first output signal and the first input signal do not meet a preset corresponding relationship; and/or, determining that the state of the control circuit is abnormal when the second output signal and the second input signal do not meet the preset corresponding relationship.

12. The self-checking method of the image sensor of claim 11, wherein the method further comprises:
   outputting a pixel column address corresponding to the first output signal when the first output signal and the first input signal do not meet the preset corresponding relationship; and/or,
   outputting a pixel row address corresponding to the second output signal when the second output signal and the second input signal do not meet the preset corresponding relationship.

13. The self-checking method of the image sensor of claim 11, wherein the method further comprises:
   when the first output signal and the first input signal do not meet the preset corresponding relationship, further determining whether the first output signal exceeds a preset range and if within the preset range, determining that a connection error occurs between the readout sub-circuits.

14. The self-checking method of the image sensor of claim 13, wherein the preset range is greater than or equal to a first preset value and less than or equal to a second preset value; wherein,
   the first preset value is greater than or equal to A, and less than or equal to B, where A is a difference value between a value of a first output signal in the preset corresponding relationship and one-fourth of a value of a first output signal in the preset corresponding relationship, and B is a difference value between the value of the first output signal in the preset corresponding relationship and one-eighth of the value of the first output signal in the preset corresponding relationship;
   the second preset value is greater than or equal to C, and less than or equal to D, where C is a sum value of the value of the first output signal in the preset corresponding relationship and one-eighth of the value of the first output signal in the preset corresponding relationship, and B is a sum value of the value of the first output signal in the preset corresponding relationship and one-fourth of the value of the first output signal in the preset corresponding relationship.

* * * * *